United States Patent [19]

Strandberg

[11] Patent Number: 4,961,519

[45] Date of Patent: Oct. 9, 1990

[54] LIME FEEDER

[75] Inventor: Anders Strandberg, Boxholm, Sweden

[73] Assignee: Boxholmkonsult AB, Boxholm, Sweden

[21] Appl. No.: 305,921

[22] Filed: Feb. 3, 1989

[30] Foreign Application Priority Data

Feb. 4, 1988 [SE] Sweden ................ 8800356

[51] Int. Cl.⁵ .............................. B65D 88/66
[52] U.S. Cl. ................... 222/133; 222/203; 222/57; 137/99.5
[58] Field of Search ................... 222/56–57, 222/500, 504, 491, 196, 202–203, 129, 133, 145, 185, 200–201; 406/48, 23, 33; 137/99.5

[56] References Cited

U.S. PATENT DOCUMENTS

| | | | |
|---|---|---|---|
| 715,031 | 12/1902 | Davidson | 222/57 X |
| 767,746 | 8/1904 | Green | 137/99.5 |
| 827,399 | 7/1906 | Sheuerman | 137/99 |
| 2,579,859 | 12/1951 | Prizer | 222/57 X |
| 2,964,052 | 12/1960 | Montagnon | 137/99.5 |
| 3,204,821 | 9/1965 | Fann | 222/41 |
| 3,818,925 | 6/1974 | Liset | 222/57 X |
| 4,798,475 | 1/1989 | Strandberg | 366/160 |

FOREIGN PATENT DOCUMENTS

| | | | |
|---|---|---|---|
| 31835 | 6/1923 | Denmark | 222/153 |
| 28480 | 12/1956 | Finland | 222/57 |
| 551084 | 2/1943 | United Kingdom | 222/57 |
| 1247538 | 9/1971 | United Kingdom | 222/133 |

Primary Examiner—Michael S. Huppert
Attorney, Agent, or Firm—Cushman, Darby & Cushman

[57] ABSTRACT

A lime feeder includes a metering driving vessel divided into two chambers arranged below a water inlet so that, alternatively one and the other chamber is filled with water and tilts between two end positions. The tilting movement is conducted by a carrier bar fastened in the metering vessel, to carriers that, in turn, drive a disk back and forth. The disk, in turn, feeds lime from a lime hopper with a movement back and forth. The lime powder is thereby brought to fall into the chamber of the metering vessel that has already been emptied. In this way, the lime will be wetted so that when it arrives in the stream of water, it is already suspended, which results in a more efficient dissolving of the lime.

4 Claims, 2 Drawing Sheets

LIME FEEDER

BACKGROUND OF THE INVENTION

Lime metering or feeding devices are used for adding lime to streams of water in proportion to the amount of water flowing in such streams. Examples of such devices are given in Swedish patent No. 7904599-6 and in Swedish patent application No. 8503000-5. Due to their construction, these devices must be made comparatively large to become economical, and they also require that a comparatively finely ground lime be used in order to ensure that it will be dissolved. Alternatively, cost increasing measures must be taken, to provide lime traps and the like.

SUMMARY OF THE INVENTION

With the above background, the invention has as its object to provide a lime feeder or a lime metering device with such a structure that, without inconveniences, it can be made small at comparatively low cost and yet provide confidence that good use is made of the lime. This is, in accordance with the invention, achieved by wetting the lime before it is released into the water stream.

BRIEF DESCRIPTION OF THE DRAWINGS

Preferable developments and embodiments of the inventive concept are expressed in the following description of a preferred embodiment in connection with the accompanying drawings, wherein.

DETAILED DESCRIPTION

Figure 1:
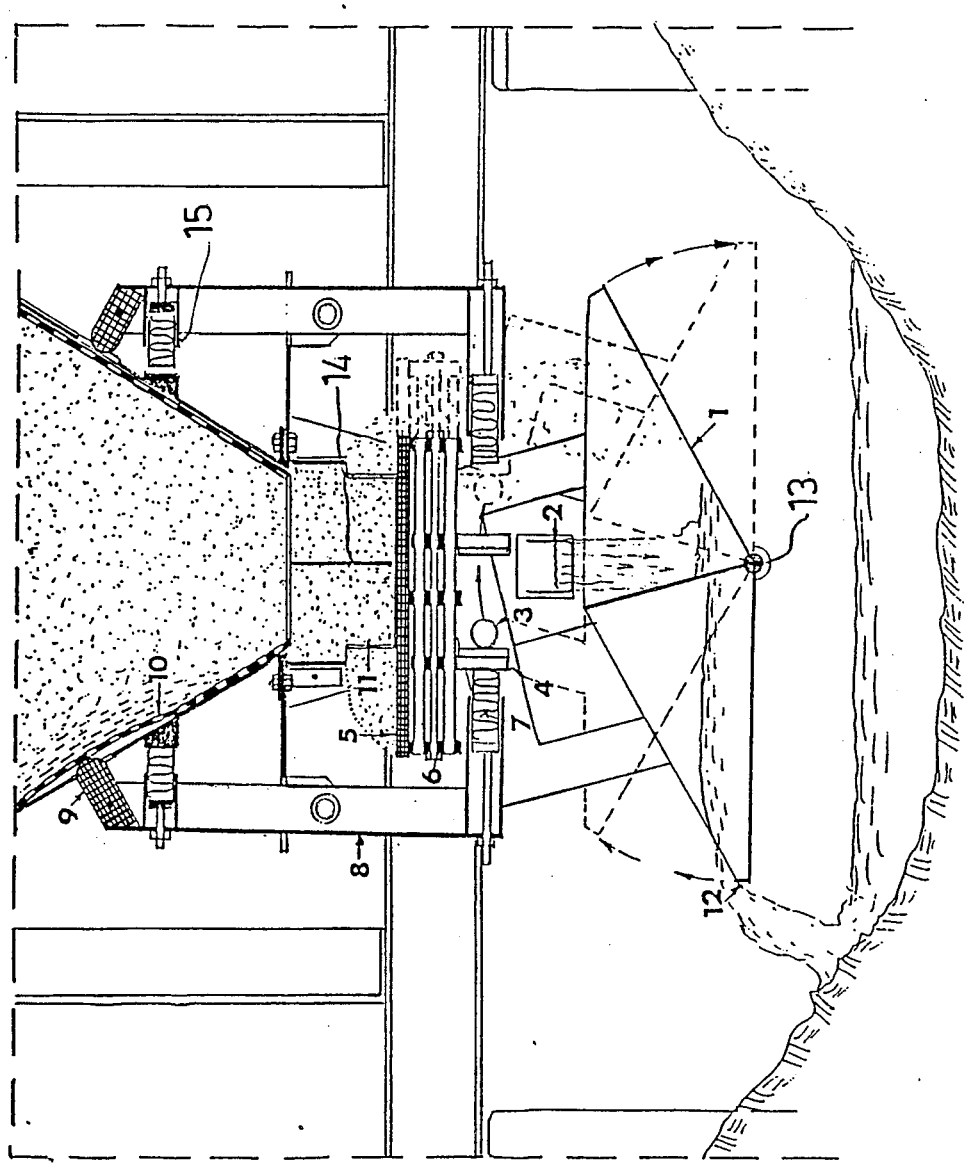
FIG. 1 shows the lime feeder, partly in section, seen from the front.
Figure 2:
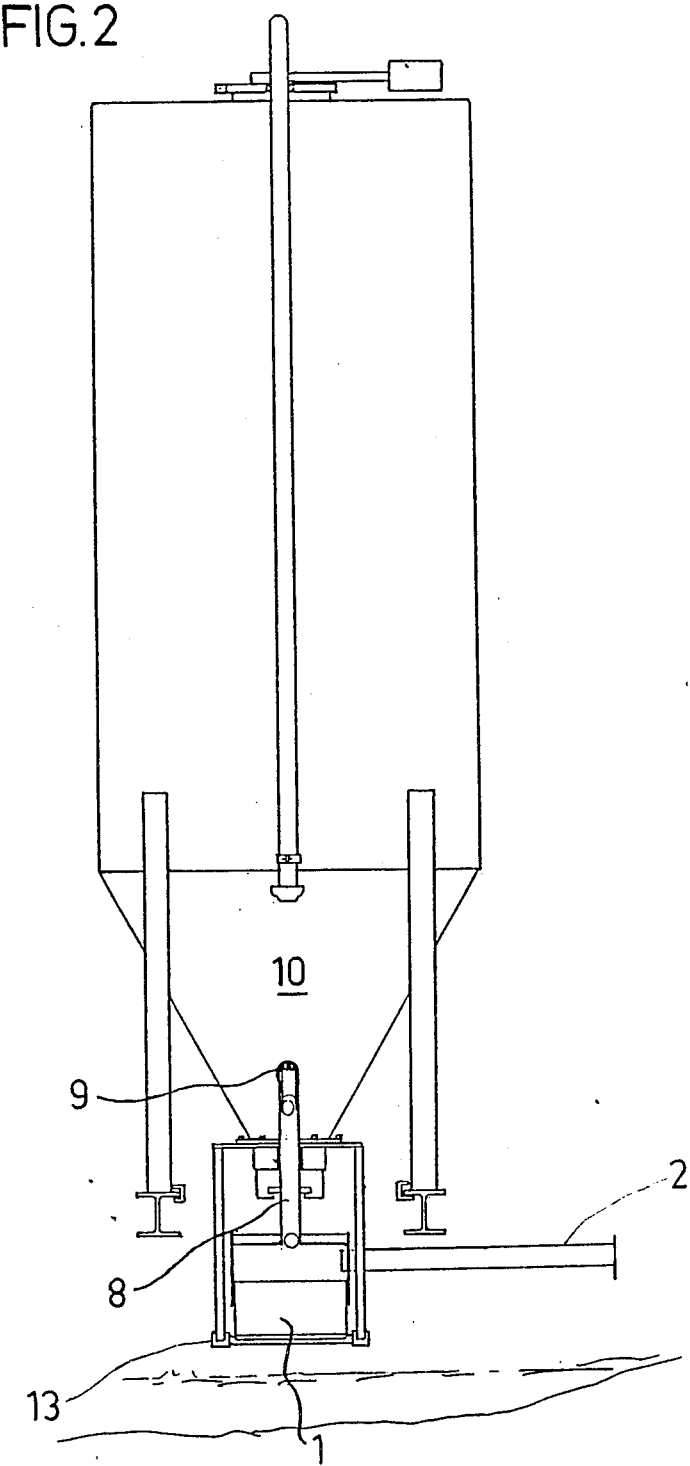
FIG. 2 shows the lime feeder seen from the side.

The lime feeder includes a metering vessel 1 consisting of two chambers. The vessel is arranged tiltable around a horizontal axle 13, about which the two chambers are laterally symmetrical. The tilting movement of the two-chambered vessel 1 back and forth is limited by stops 7. Centrally over the tilting axle 13, an inlet channel 2 for a flow of water is arranged and water thus streams into one chamber of the driving vessel 1 until a predetermined extent of filling has been achieved, namely one that is so large that the vessel tilts over to a respective side. A bar 3 will then strike against a stop 7 on the other side simultaneously with the rushing out of the water from this part of the vessel. The vessel then maintains this position until the other water chamber is filled with water sufficiently to tilt the vessel in the opposite direction. Between the bar 3 and the stops 7 are arranged two carriers or drivers 4 on each side of the bar 3 so that at the time of tilting movement of the vessel, the carriers 4 are alternatively pushed left and right. The carriers 4 are, in turn, fastened to disk 5 situated below a lime hopper. The lime hopper ends shortly above the disk 5 with an intermediate opening 11, so that the disk 5, upon lateral movement, can carry lime with it out of the hopper. At the consecutive movement of the disk the lime is, of course, prevented from being fed into the vessel partly by means of the weight of the lime in the hopper and partly by means of a partition 14 located in the middle of the hopper. As a result, each tilting movement of the vessel 1 back and forth will result in lime being fed out of the lime hopper by means of the disk 5, then falling into the respective chamber of the driving vessel 1 that is being filled.

When the respective chamber of the driving vessel 1 is filled the lime powder is thus already on its place and it will thus be wetted already before the lime enters the water. Since the lime powder is wetted, its tendency to become lumped or to flocculate is reduced, and the suspension of the lime in the water will become considerably more efficient. The water will have access to the entire surface of the lime powder. This results in the lime powder being dissolved considerably faster and more efficiently than what otherwise is the case.

The two chambers of the driving vessel 1 are both at their outlet ends provided with a weir-like threshold 12, so that a certain amount of water always remains in the vessel. This enhances distinct tilting since the water serves as a balance weight. Additionally, in this way, the return flushing of the bottom of the vessel, where lime particles can still be left is achieved. Furthermore, it is ensured that, even at a slow water streaming velocity, the lime that is fed down into the respective chambers of the driving vessel 1 already from the beginning of feeding can begin to be dissolved by the water.

Since the device is symmetrical laterally of the tilting axis, it is of little significance if ice formation or lime deposits occur on the vessel, since these formations most probably will themselves be similarly symmetrical and thereby balance each other.

The stops 7 are, by means of arms 8, turnably journaled in the middle, and arranged so that at each strike from the striking bar 3 on the tilting of the vessel 1 with a rubber block, the stops 7 strike against the rubber wall 10 of the lime hopper in order to prevent the lime from hanging in the lime hopper.

The thresholds 12 also prevent possibly formed lime clogs from being flushed out of the vessel before they are dissolved. Instead, they are flushed back with the water and will be subjected to its dissolving influence until they have been dissolved or suspended.

The walls of the hopper have opening only in the direction of movement of the disk 5 on the rear and front walls 11, in order to prevent lime from spilling over.

The stops 7 are constituted by springs, and the lever arms 8 for transporting the movement from the stops to the sides of the hopper are provided with counteracting springs 15 arranged between the hopper and the arms. The location of the stops 7 is adjustable by means of bolt and nut arrangements, as are the springs 15.

The lime feeder or lime metering device according to the invention is very silent, despite the back and forth tilting motion, and it can therefore be placed close to houses.

As is apparent from the above description and the drawings, the metering or feeding device according to the invention includes a very small number of parts that, without functional problems, can be made comparatively small. It is therefore possible to fabricate the lime feeder of the described kind so as to be comparatively small. It is also possible to use comparatively small differences in height and the lime feeder can thus with great advantage be used also on small streams in order there to ensure that lime is always added in proportion to the amount of water flowing in the stream.

I claim:

1. A lime feeder for dispensing lime into a flowing stream of water, comprising:

a hopper having a downwardly directed outlet;

a metering vessel;

wall means including a generally upright dividing wall dividing the metering vessel into two laterally adjacent upwardly opening chambers;

horizontal axle means mounting the metering vessel for rocking movement between a first position in which one of said chambers is disposed for being filled and the other of said chambers is disposed for emptying, and a second position in which the other of said chambers is disposed for being filled and said one of said chambers is disposed for emptying;

said wall means for each chamber including sidewalls and a bottom wall defining an outlet through which, in use, water and lime pour for dispensing lime into a stream of water;

means defining a water inlet channel disposed for directing an inlet stream of water into whichever of said chambers is then disposed for being filled;

said horizontal axle means being centered under said water inlet channel and said generally upright dividing wall being disposed to be substantially vertical and vertically aligned with said horizontal axle means when said metering vessel while rocking from said first position to said second position is disposed midway between said first and said second positions; and flow direction means associated with said outlet of said hopper and with said metering vessel for laterally directing lime flowing out of said hopper through said outlet laterally relative to the longitudinal axis of said horizontal axle means into preferentially greater vertical juxtaposition with whichever of said chambers as is then disposed for being filled;

said flow direction means including a vertically extending partition wall arranged in said outlet in vertical alignment with said horizontal axle means, for dividing flow of lime from said outlet into a one portion disposed over said one chamber, and another portion disposed over said other chamber; and a valve means for selectively alternately permitting and preventing flow of said portions into the respective chambers, depending on which chamber is then disposed for being filled.

2. The lime feeder of claim 1, wherein:

said wall means for each chamber further includes a threshold extending between the respective said sidewalls at a laterally outer edge of a respective said bottom wall and thereby defining a respective outlet weir over which lime and water must flow for emptying from the respective chamber, whereby a residual amount of water is maintained in each said chamber as such chamber is rocked from being disposed for emptying, to being disposed for being filled.

3. The lime feeder of claim 1, wherein:

said valve means comprises a horizontal disk arranged closely under a lower edge of said partition wall, means supporting said disk for lateral shifting, and means on said metering vessel engageable with means on said disk for correspondingly laterally shifting said disk as said metering vessel rocks from said first position to said second position and from said second position to said first position.

4. The lime feeder of claim 3, further including:

means associated with said metering vessel for alternately striking said hopper on opposite sides of said partition wall as said metering vessel rocks from said first position to said second position and from said second position to said first position.

* * * * *